(12) United States Patent
Park

(10) Patent No.: US 6,549,546 B1
(45) Date of Patent: Apr. 15, 2003

(54) CALL CUT-OFF DETECTION CIRCUIT FOR SWITCH AND METHOD OF THE SAME

(75) Inventor: Dong Won Park, Kwangmyung (KR)

(73) Assignee: LF Information & Communications, Ltd., Seoul (KR)

( * ) Notice: Subject to any disclaimer, the term of this patent is extended or adjusted under 35 U.S.C. 154(b) by 0 days.

(21) Appl. No.: 09/223,732

(22) Filed: Dec. 31, 1998

(30) Foreign Application Priority Data

Mar. 27, 1998 (KR) .............................................. 98-10831

(51) Int. Cl.[7] .............................. H04J 3/12; H04M 1/00; H04M 3/00
(52) U.S. Cl. ........................................ 370/522; 379/350
(58) Field of Search ................................. 370/310, 328, 370/351, 357, 360, 369, 384, 386, 431, 433, 464, 476; 455/403, 423–425; 379/1.01, 9, 27.01, 32.01, 156, 157, 219, 350, 372, 377

(56) References Cited

U.S. PATENT DOCUMENTS 4,280,217 A * 7/1981 Hafer et al. ................. 370/371
5,450,485 A * 9/1995 Hamilton .................... 379/377
5,995,494 A * 11/1999 Horikawa .................... 370/310

* cited by examiner

Primary Examiner—Seema S. Rao
Assistant Examiner—Kevin C. Harper
(74) Attorney, Agent, or Firm—Fleshner & Kim, LLP

(57) ABSTRACT

A call cut-off detection circuit for a switch and a method of the same are disclosed. The circuit includes a time switch unit switching a first PCM data, a COB processing circuit combining the first PCM data and a first call state data or separating the first PCM data and a second call state data from a second PCM data, a processor writing the first call state data into the COB processing circuit and judging the state of a call cut-off of a channel based on the second call state data separated by the COB processing circuit, and a local link unit connected between the COB processing circuit and a space switch for transmitting and receiving the second PCM data, for thereby implementing a good quality call and enhancing a reliability of the switch by detecting a call cut-off based on a simple method.

20 Claims, 4 Drawing Sheets

CALL CUT-OFF DETECTION CIRCUIT FOR SWITCH AND METHOD OF THE SAME

BACKGROUND OF THE INVENTION

1. Field of the Invention

The present invention relates to a switch, and in particular to a call cut-off detection circuit for a switch and a method of the same which are capable of implementing a good quality call and enhancing a reliability of the switch by detecting a call cut-off based on a simple method.

2. Description of the Conventional Art

Generally, a call cut-off occurs during a call. The call cut-off case is classified into a case that a call is inputted from a telephone terminal and is allocated to an audio channel(PCM channel) at a base station and uses a trunk of a switch, and then is cut off, and a case that a call is cut off due to an external environment before a stop button of the telephone terminal is pushed. The above-described two cases are called a call cut-off.

FIG. 1 illustrates a conventional electric circuit which includes a processor 10, a time switch unit 20, a local link unit 30, a central link unit 40, and a space switch 50.

The processor 10 controls a call process and a maintenance of a switch and controls the time switch 20. The local link unit 30 outputs a 8-bit PCM data outputted from the time switch 20 to the central link unit 40 through a STM-1 framer, and the 8-bit PCM data inputted from the central link unit 40 is outputted to the time switch 20. In addition, the space switch 50 switches the 8-bit PCM data inputted from the central link unit 40 by the highway, and outputs the 8-bit PCM data inputted from another subscriber or another switch to the central link unit 40.

The time switch 20 includes a speech memory storing the 8-bit PCM data as a block for receiving the 8-bit PCM data from the subscriber and performing an interchange of the time slot, and a write address generator 12 and a read address generator 13 for generating a write and read address WA and RA to the speech memory 11 in accordance with a clock signal CP2 of 16.384 MKHz and a frame pulse signal FP2 of 8 KHz.

The operation of the conventional electric switch will be explained with reference to FIG. 1.

The 8-bit PCM data inputted to an externally connected subscriber terminal is stored into the speech memory 11 by the channel in accordance with the write address WA outputted from the write address generator 12, and the thusly stored 8-bit PCM data is outputted to the local link unit 30 in accordance with a read address RA outputted from the read address generator 13. At this time, the read address generator 13 is controlled by the processor 10. Therefore, the local link unit 30 outputs the 8-bit PCM data outputted from the speech memory 11 to the central link unit 40 and the space switch 50 through a high speed link of 155.520 Mbps.

When the 8-bit PCM data switched by the space switch 50 is inputted through the central link unit 40 and the local link unit 30, the 8-bit PCM data is stored into the speech memory 11 by the channel in accordance with the write address WA outputted from the write address generator 12. Therefore, the 8-bit PCM data stored in the speech memory 11 is outputted to the telephone terminal in accordance with the rear address RA outputted from the read address generator 13.

However, in the conventional switch, if a call cut-off occurs, a switch operator is capable of detecting a call cut-off state only based on a report from a subscriber. Namely, there is not way to detect the call cut-off state in the conventional art. Therefore, the switch operator is not capable of quickly repairing the cut-off call, so that it is impossible to increase a reliability of the switch.

SUMMARY OF THE INVENTION

Accordingly, it is an object of the present invention to provide a call cut-off detection circuit for a switch and a method of the same which overcome the aforementioned problems encountered in the conventional art.

It is another object of the present invention to provide a call cut-off detection circuit for a switch and a method of the same which are capable of quickly detecting a call cut-off occurring during a call.

It is another object of the present invention to provide a call cut-off detection circuit for a switch and a method of the same which are capable of implementing a good quality call and enhancing a reliability of the switch by detecting a call cut-off based on a simple method.

To achieve the above objects, there is provided a call cut-off detection circuit for a switch which includes a time switch unit switching a first PCM data, a COB(Cut-Off Call Bit) processing circuit combining the first PCM data and a first call state data or separating the first PCM data and a second call state data from a second PCM data, a processor writing the first call state data into the COB processing circuit and judging the state of a call cut-off of a channel based on the second call state data separated by the COB processing circuit, and a local link unit connected between the COB processing circuit and a space switch for transmitting and receiving the second PCM data.

To achieve the above objects,.there is provided a call cut-off detection method for a switch which includes the steps of storing a first call state data into a COB processing circuit, combining a first PCM data inputted from the side of a telephone terminal and the first call state data and transmitting a second PCM data to the side of a space switch, checking whether the second PCM data is inputted from the side of the space switch, separating the second PCM data inputted from the side of the space switch into a first PCM data and a second call state data, and comparing the thusly separated second call state data and first call state data and judging whether a call cut-off of a corresponding channel occurred.

Additional advantages, objects and features of the invention will become more apparent from the description which follows.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
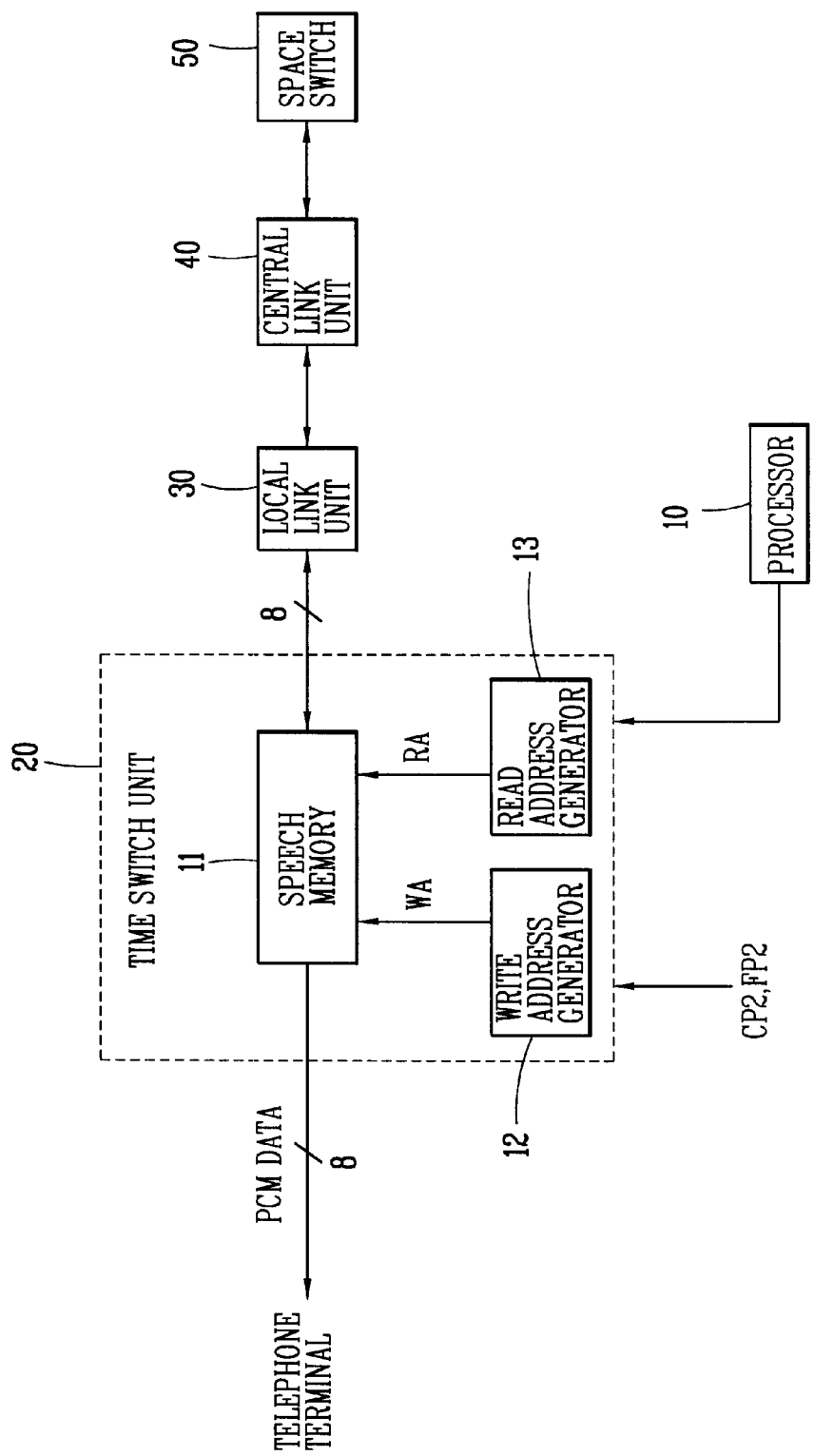
FIG. 1 is a view illustrating a conventional electrical switch.
Figure 2:
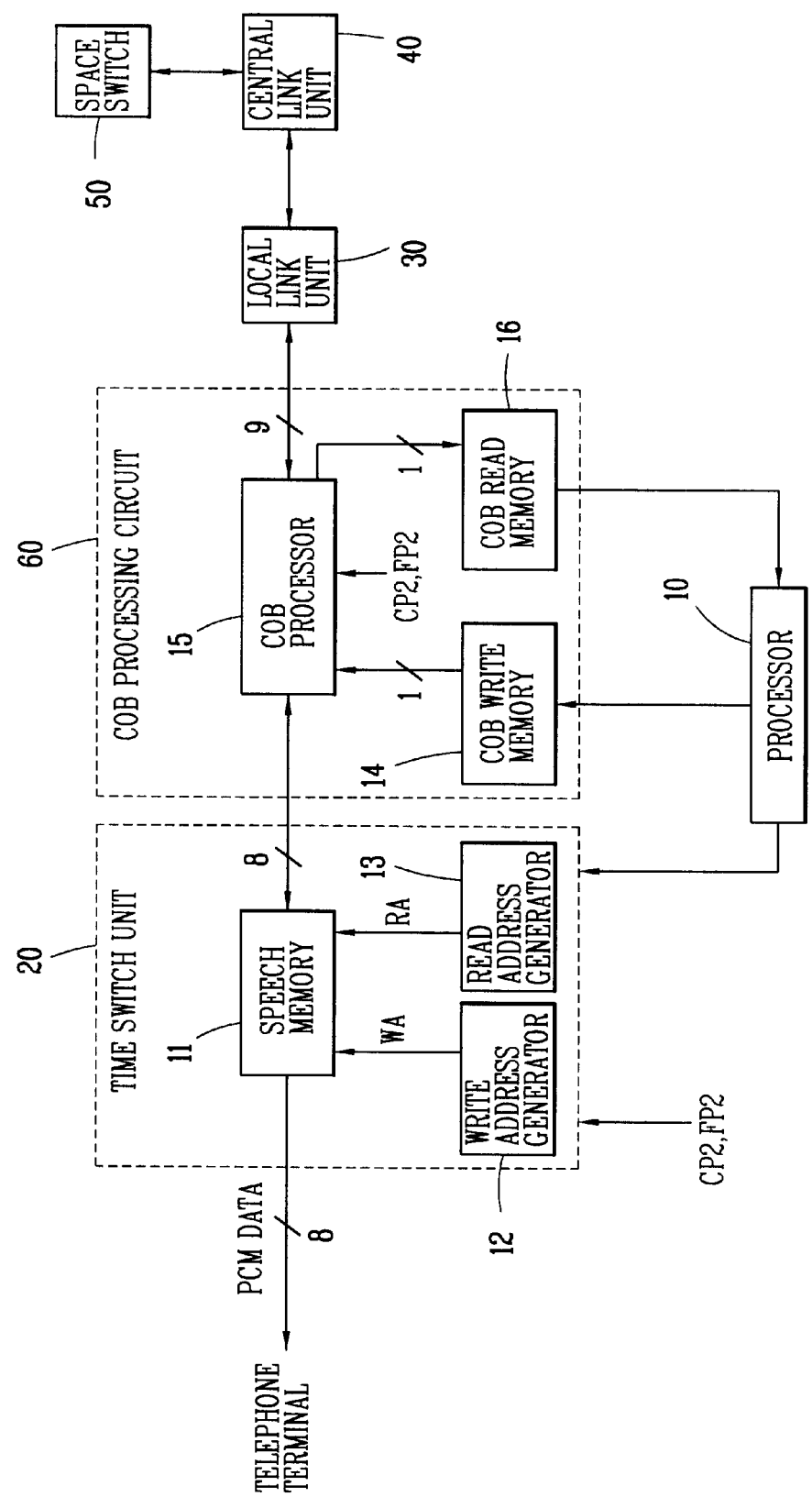
FIG. 2 is a block diagram illustrating a call cut-off detection circuit for a switch according to the present invention.

FIG. 2 illustrates a call cut-off detection circuit for a switch according to the present invention. As shown therein, a COB(Cut-Off Call Bit) processing circuit 60 is further provided in the conventional switch as shown in FIG. 1.

The COB processing circuit 60 is a circuit block which combines a 8-bit PCM data and a first COB data or separates a 8-bit PCM data and a 1-bit second COB data from a 9-bit PCM data. The COB processing circuit 60 includes a COB write memory 14 storing a first COB data provided from the processor 10, a COB processor 15 which combines a 8-bit PCM data outputted from the time switch unit 20 and a first COB data outputted from the COB write memory 14 or separates a 8-bit PCM data and a 1-bit second COB data from a 9-bit PCM data, and a COB read memory 16 storing the second COB data separated by the COB processor 14.

The local link unit 30 outputs a 9-bit PCM data inputted through the COB processing circuit 60 to the central link unit 40 through a STM-1 framer or applies the 9-bit PCM data inputted from the central link unit 40 to the local link unit 30. The space switch 50 switches the 9-bit PCM data inputted from the central link unit 40 by the highway and outputs the 9-bit PCM data inputted from another subscriber or another switch to the central link unit 40.

Figure 3:
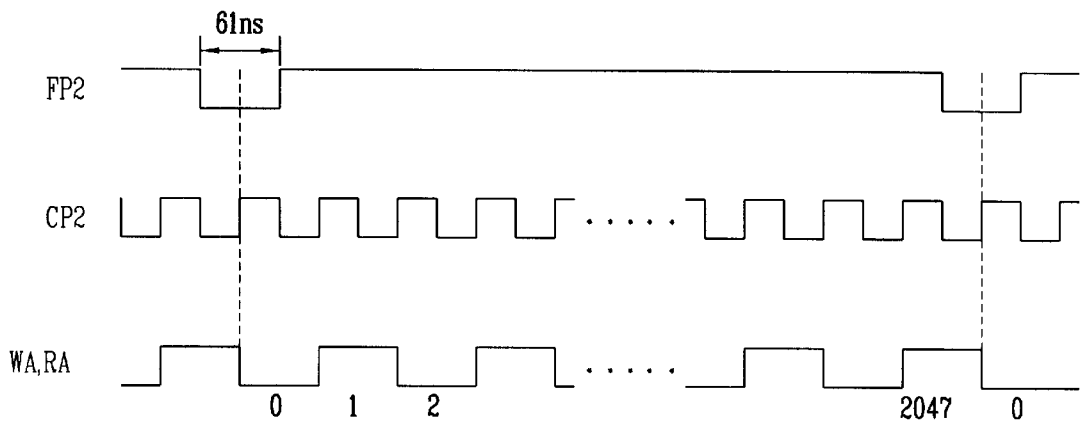
FIG. 3 is a wave form diagram illustrating a PCM data of 2048 channels written/read in an interval of a 1-frame pulse signal according to the present invention.

The operation of the cut-off detection circuit for a switch according to the present invention will be explained with reference to the accompanying drawings. First, when a 8-bit PCM data(channel data) is inputted from an externally connected subscriber terminal, the speech memory 11 of the time switch unit 20 stores the 8-bit PCM data by the channel in accordance with a write address(WA) outputted from the write address generator 12, and outputs the 8-bit PCM data in accordance with a read address RA outputted from the read address generator 13. Namely, as shown in FIG. 3, the speech memory 11 writes/reads the PCM data of 2048 channels during one interval of the frame pulse signal FP2.

The processor 10 controls the read address generator 13 and writes the 1-bit first COB data, which indicates a call state in the side of the telephone terminal, into the COB write memory 14 of the COB processing circuit 60, and the COB write memory 14 sequentially outputs the 1-bit first COB data to the COB processor 15 with respect to the 2048 channels in accordance with the control of the processor 10. At this time, if the channel is busy, the first COB data is set to 0, and if the channel is idle, the same is set to 1. The first COB data of each channel is detected when a subscriber pushes a button of the telephone terminal and is managed based on the database.

Therefore, the COB processing unit 15 combines the 8-bit PCM data and the 1-bit first COB data and outputs the 9-bit PCM data to the local link unit 30, and the local link unit 30 transmits the 9-bit PCM data to the central link unit 40 through a high speed link of 155.520 Mbps. Therefore, the space switch 50 switches the 9-bit PCM data inputted from the central link unit 40 by the highway.

Figure 4:
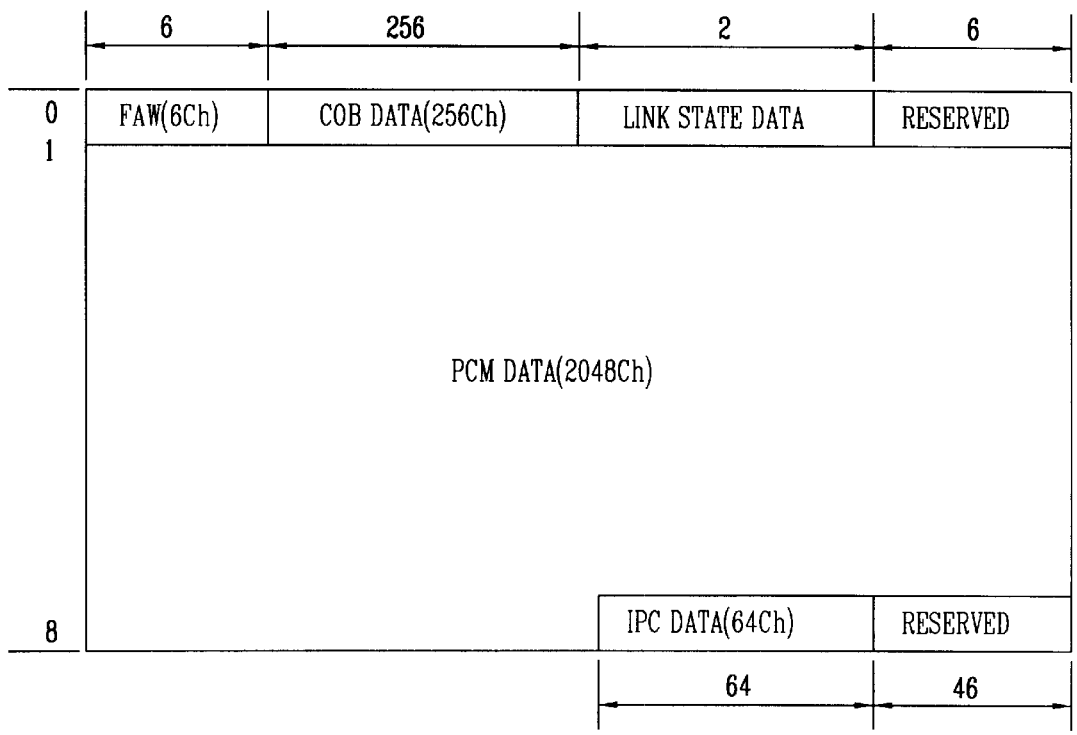
FIG. 4 is a view illustrating a link frame format transmitted through the local link unit of FIG. 2.

FIG. 4 illustrates the link frame format of the 9-bit PCM data outputted from the local link unit 30. As shown therein, the link frame format has a 2048 channel PCM data, and since there is one first COB data per one byte (8-bit) of the PCM data, the call state data becomes 256-byte.

Thereafter, when the 9-bit PCM data is inputted from the space switch 50 through the central link unit 40 and the local link unit 30, the COB processor 15 of the COB processing circuit 60 separates the 8-bit PCM data and the 1-bit second COB data, which indicates a call state of the switch network, from the 9-bit PCM data, and the 8-bit PCM data is stored into the speech memory 11, and the 1-bit second COB data is sequentially stored into the COB read memory 16 by the channel.

The processor 10 reads the second COB data of the channels, which are busy, from the COB read memory 16 and compares the thusly read data with the first COB data in the database. As a result of the comparison, if the second COB data and the first COB data in the database are not identical, the processor 10 judges that a call cut-off has occurred in the current channel. For example, it is assumed that if the channel is busy, the first COB data in the database is set to 0, and if the channel is idle, the same is set to 1. The processor 10 judges that a call cut-off has occurred in a corresponding channel when the second COB data is 1.

Therefore, if the call cut-off occurs, the processor 10 outputs a channel information and a call cut-off information to a switch operator, and when the second COB data is 0, the read address generator 13 is controlled, and the 8-bit PCM data stored in the speech memory 11 is outputted to the side of the telephone terminal.

Figure 5:
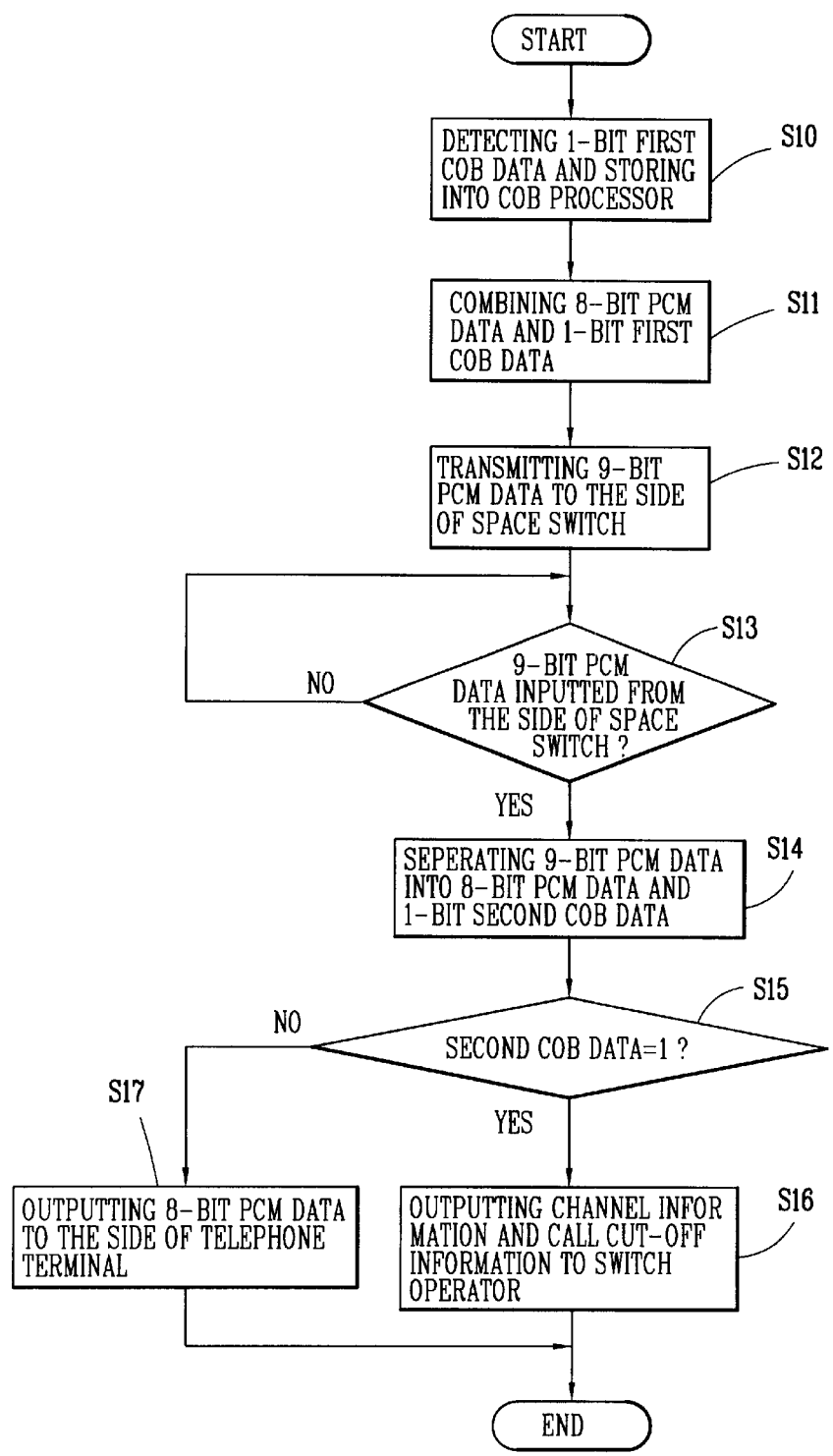
FIG. 5 is a flow chart illustrating a call cut-off detection operation of the switch of FIG. 2.

The remaining operation will be explained with reference to the flow chart of FIG. 5.

First, the processor 10 stores the 1-bit first COB data, which indicates the call state of a corresponding channel, into the COB write memory 12 in Step S10. At this time, if the channel is busy, the first COB data is set to 0, and if the channel is idle, the same is set to 1.

The COB processor 15 of the COB processing circuit 60 combines the 8-bit PCM data outputted from the speech memory 11 and the 1-bit first COB data outputted from the COB write memory 14, and then outputs a 9-bit PCM data in Step S11. The local link unit 30 then transmits the 9-bit PCM data to the side of the space switch through a high speed link of 155.520 Mbps in Step S12.

Thereafter,-when the 9-bit PCM data is inputted from the space switch 50 through the central link unit 40 and the local link unit 30 in Step S13, the COB processor 15 separates the 8-bit PCM data and the 1-bit second COB data from the 9-bit PCM data and outputs the 8-bit PCM data to the speech memory 11. The 1-bit second COB data is then sequentially stored into the COB read memory 16 by the channel in step S14.

Therefore, the processor 10 reads the second COB data of the current busy channels from the COB read memory and judges whether the second COB data is set to 1.

As a result of the judgement, if the read second COB data is 1, the processor 10 judges that a call cut-off occurred in the current channel and transmits the channel information and call cut-off information to the switch operator in Step S16. If the second COB data is 0, the processor 10 controls the read address generator 13, so that the 8-bit PCM data stored in the speech memory 11 is outputted to the side of the telephone terminal in Step S17.

As described above, in the present invention, the call state data of the current channel is compared with the call process database of the processor for thereby detecting a call cut-off which may occur during the call. Therefore, in the present invention, sine the state of a call cut-off is quickly detected, it is possible to obtain a good quality call and enhance a reliability of the switch.

Although the preferred embodiments of the present invention have been disclosed for illustrative purposes, those skilled in the art will appreciate that various modifications, additions and substitutions are possible, without departing from the scope and spirit of the invention as recited in the accompanying claims.

What is claimed is:

1. A call cut-off detection circuit for a switch, comprising:
   a time switch unit switching a first PCM data;
   a COB(Cut-Off Call Bit) processing circuit combining the first PCM data and a first call state data or separating the first PCM data and a second call state data from a second PCM data;
   a processor writing the first call state data into the COB processing circuit and judging the state of a call cut-off of a channel based on the second call state data separated by the COB processing circuit; and
   a local link unit connected between the COB processing circuit and a space switch for transmitting and receiving the second PCM data.

2. The circuit of claim 1, wherein said first PCM data is 8-bit, and said second PCM data is 9-bit.

3. The circuit of claim 1, wherein said first and second call state data are 1-bit, and said first call state data is a data indicating a call state of a channel in the side of a telephone terminal, and said second call state data is a data indicating a call state of a channel in a switch network.

4. The circuit of claim 3, wherein said first and second call state data are set to a first level when the channel is busy, and the same are set to a second level when the channel is idle, and the first and second levels are 0 or 1.

5. The method of claim 3, wherein said first and second call state data are 1-bit, and said first call state data is a data indicating a call state of a channel in the side of a telephone terminal, and said second call state data is a data indicating a call state of a channel in a switch network.

6. The method of claim 5, wherein said first and second call state data are set to a first level when the channel is busy, and the same are set to a second level when the channel is idle, and the first and second levels are 0 or 1.

7. The circuit of claim 1, wherein said COB processing circuit includes:
   a COB write memory storing a first call state data provided from the processor therein;
   COB processor combining a first PCM data outputted from the time switch unit and a first call state data outputted from the COB write memory and separating the first PCM data and second call state data from the second PCM data; and
   a COB read memory storing the second call state data separated by the COB processor.

8. The circuit of claim 7, wherein said first PCM data is 8-bit, and said second PCM data is 9-bit.

9. The circuit of claim 1, wherein said processor judges that a call cut-off occurred when the second call state data is different from the first call state data stored in the database.

10. The circuit of claim 1, wherein said frame format of the PCM data outputted from the local link unit includes a PCM data of 2048 channels and a call state data of 256 bytes, and said call state data is added to the region except for the PCM data region.

11. The circuit of claim 1, wherein said processor detects a pushed state of a button of the telephone terminal by a subscriber for thereby generating a first call state data.

12. The circuit of claim 11, wherein said first and second call state data are 1-bit, and said first call state data is a data indicating a call state of a channel in the side of a telephone terminal, and said second call state data is a data indicating a call state of a channel in a switch network.

13. A call cut-off detection method, comprising:
   storing a first call state data into a COB processing circuit;
   generating a first combination PCM data by combining a first PCM data inputted from a side of a telephone terminal and the first call state data, and transmitting the first combination PCM data to a side of a space switch;
   checking whether a second combination PCM data is inputted from the side of the space switch;
   separating the second combination PCM data into a second PCM data and a second call state data when the second combination PCM data is inputted; and
   comparing the separated second call state data and the first call state data and judging whether a call cut-off of a corresponding channel occurred.

14. The method of claim 13, wherein said first PCM data is expressed in 8 bits, and said second combination PCM data is expressed in 9 bits.

15. The method of claim 13, wherein said first call state data is detected based on a pushed state of a telephone terminal by a subscriber, and said first call state data is the contents of the database of the processor.

16. The method of claim 13, wherein in said call cut-off judging step, the second call state data of the bust channels is read from the COB processing circuit, and it is judged that a call cut-off occurred when the second call state data is different from the first call state data.

17. The method of claim 16, wherein said first call state data is a data indicating a call state of a corresponding channel in the side of the telephone terminal, and said second call state data is a data indicating a call state of a corresponding channel in the switch network.

18. The method of claim 13, further comprising:
   outputting a channel information and a call cut-off information to a switch operator when the first and second call state data are different; and
   outputting said second PCM data of the second combination PCM data to the side of the telephone terminal when the first and second call state data are identical.

19. The method of claim 18, wherein said first and second call state data are set to a first level when the channel is busy, and the same are set to a second level, when the channel is idle, and the first and second levels are 0 or 1.

20. The method of claim 19, wherein said first call state data is detected based on a pushed state of a button of the telephone terminal by a subscriber, and said first call state data is the contents of the database of the processor.

* * * * *